United States Patent
Mikami et al.

(10) Patent No.: US 9,921,502 B2
(45) Date of Patent: Mar. 20, 2018

(54) THERMOSETTING POWDER COATING MATERIAL AND COATING METHOD

(71) Applicant: FUJI XEROX CO., LTD., Tokyo (JP)

(72) Inventors: Masato Mikami, Kanagawa (JP); Satoshi Yoshida, Kanagawa (JP); Akihiko Noda, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/988,243

(22) Filed: Jan. 5, 2016

(65) Prior Publication Data

US 2017/0082934 A1 Mar. 23, 2017

(30) Foreign Application Priority Data

Sep. 18, 2015 (JP) .................................. 2015-185874

(51) Int. Cl.
*G03G 9/08* (2006.01)
*G03G 9/093* (2006.01)
*G03G 13/05* (2006.01)

(52) U.S. Cl.
CPC ........... *G03G 9/0827* (2013.01); *G03G 9/093* (2013.01); *G03G 13/05* (2013.01)

(58) Field of Classification Search
CPC ....... G03G 9/0827; G03G 9/093; G03G 13/05
See application file for complete search history.

(56) References Cited

U.S. PATENT DOCUMENTS

| | | | | | |
|---|---|---|---|---|---|
| 5,461,089 | A | * | 10/1995 | Handyside | B01J 2/04 264/12 |
| 5,502,118 | A | * | 3/1996 | Macholdt | C08G 63/914 430/108.22 |
| 5,898,043 | A | * | 4/1999 | Uemae | C09D 5/031 428/407 |
| 6,270,853 | B1 | * | 8/2001 | Brown | B05D 1/045 343/872 |
| 6,458,250 | B1 | | 10/2002 | Holliday et al. | |
| 2009/0252869 | A1 | * | 10/2009 | Rodrigo | C09D 167/06 427/180 |

FOREIGN PATENT DOCUMENTS

| | | |
|---|---|---|
| JP | H02-4475 A | 1/1990 |
| JP | H06-114297 A | 4/1994 |
| JP | H11-76912 A | 3/1999 |
| JP | 2001-137768 A | 5/2001 |
| JP | 2004-514547 A | 5/2004 |

OTHER PUBLICATIONS

Cosmos Plastics & Chemicals; Aerosil® R 972 Product Data Sheet, p. 1-2, retrieved Dec. 8, 2015.*

* cited by examiner

*Primary Examiner* — Robert Jones, Jr.
(74) *Attorney, Agent, or Firm* — Oliff PLC

(57) ABSTRACT

A thermosetting powder coating material includes a powder particle containing a thermosetting resin and a thermosetting agent and has a volume particle size distribution index GSDv of less than 1.20 and an average circularity of not less than 0.96.

18 Claims, 3 Drawing Sheets

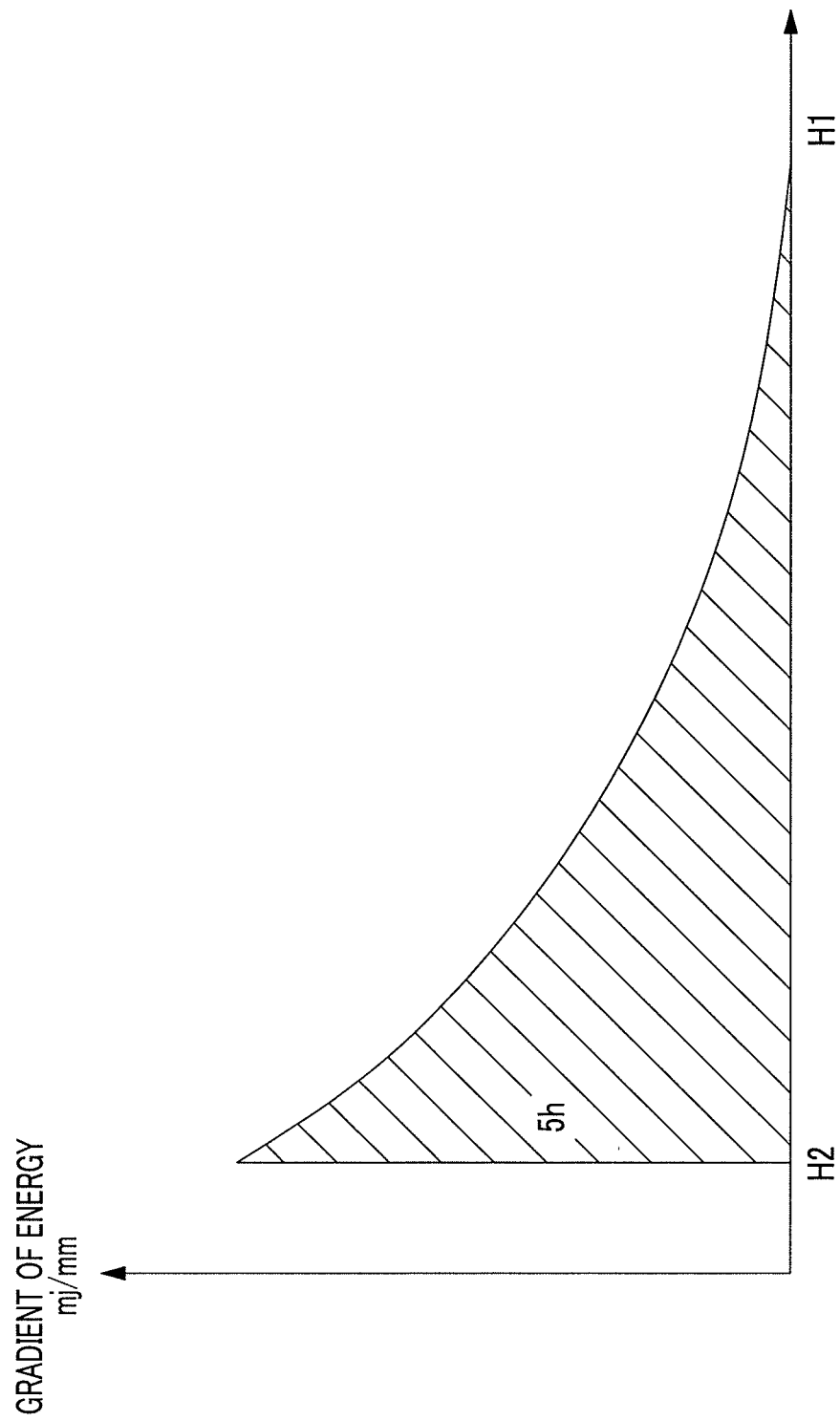

THERMOSETTING POWDER COATING MATERIAL AND COATING METHOD

CROSS-REFERENCE TO RELATED APPLICATIONS

This application is based on and claims priority under 35 USC 119 from Japanese Patent Application No. 2015-185874 filed Sep. 18, 2015.

BACKGROUND

1. Technical Field

The present invention relates to a thermosetting powder coating material and a coating method.

2. Related Art

Since a small amount of volatile organic compounds (VOC) are discharged in a coating step and a powder coating material which is not attached to a coated material may be collected and reused after the coating, a powder coating technology using a electrostatic coating material is given attention from the viewpoint of global environment protection.

Electrostatic coating of the powder coating material is a coating method performed in such a manner that generally, a coated material is set to be an earth pole, and an electrode on the coating device side is set to be a negative pole, and a voltage is applied therebetween so as to form an electrostatic field, and a negatively charged powder coating material is attached to the coated material by an electrostatic force. Since the coated material is set to be the earth pole, the coated material is necessary to have conductivity so as to perform the coating method.

SUMMARY

According to an aspect of the invention, there is provided a thermosetting powder coating material which includes a powder particle containing a thermosetting resin and a thermosetting agent and has a volume particle size distribution index GSDv of less than 1.20 and an average circularity of not less than 0.96.

BRIEF DESCRIPTION OF THE DRAWINGS

Exemplary embodiments of the present invention will be described in detail based on the following figures, wherein:

FIG. 2 is a diagram illustrating a relationship between a vertical load and a gradient of energy which are obtained by using the powder rheometer.

DETAILED DESCRIPTION

Figure 1A:
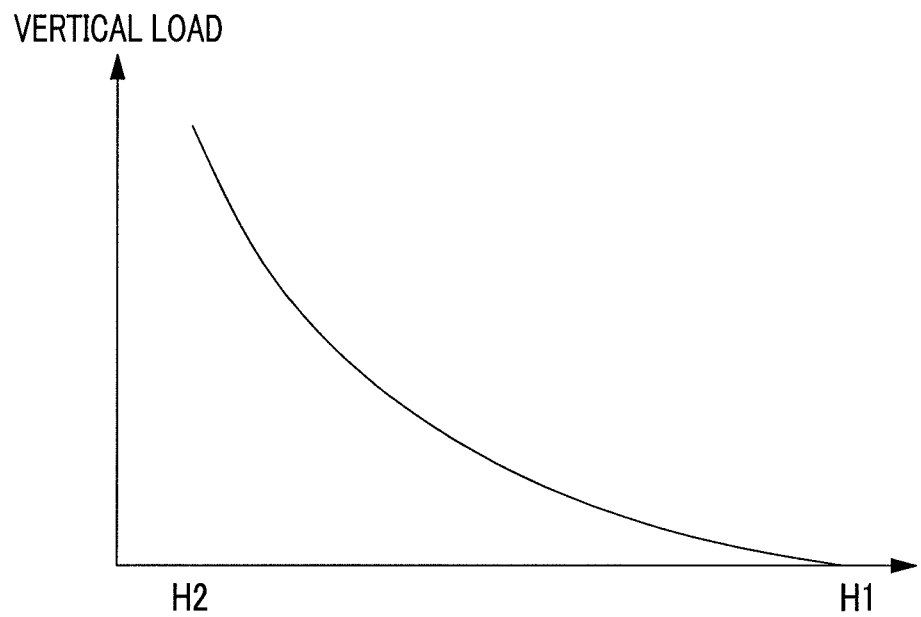
FIGS. 1A and 1B are diagrams illustrating a measuring method of a total amount of energy by using a powder rheometer.

Hereinafter, exemplary embodiments of the invention will be described. These description and examples merely illustrate the embodiments, and thus do not limit the scope of the invention.

Regarding an expression "step" in the present specification, not only an independent step, but also a step which cannot be clearly distinguished from other steps are included in the "step" as long as the intended purpose of the step is achieved.

Thermosetting Powder Coating Material

The thermosetting powder coating material (hereinafter, simply referred to as "powder coating material" in some cases) in the exemplary embodiment includes a powder particle which contains a thermosetting resin and a thermosetting agent, in which a volume particle size distribution index GSDv is less than 1.20, and an average circularity is equal to or greater than 0.96.

The powder coating material in the exemplary embodiment forms a coating film which has excellent smoothness and high uniformity of a thickness thereof, even when performing electrostatic coating on a non-conductive member.

In the related art, in order to realize the electrostatic coating on the non-conductive member, a variety of techniques of electrifying a surface to be coated of the non-conductive member are known. For example, there is a technique of imparting conductivity to the surface to be coated through the coating of the conductive primer. However, the coating of the conductive primer causes an increase in cost, and if nonuniformity of the coating of the conductive primer occurs, it causes nonuniformity of the coating of the powder coating material, and thereby deteriorating the smoothness of the coating film.

In addition, a technique of applying steam to a surface to be coated and then adjusting the amount of water of the surface to be coated so as to electrify the surface to be coated is known. However, when applying the steam to the surface to be coated, the steam is generated from the coated surface in a baking step, and thereby deteriorating the smoothness of the completed coating film.

In addition, as a technique of electrifying the coated surface of the non-conductive member, there is a technique of imparting a charge through corona discharge or the like. Such a technique is desirable from an aspect that the above phenomenon caused by undercoating of the conductive primer or steam treatment does not occur. However, in this technique, compared to the coating of the conductive primer, the electrification of the surface to be coated is weak, and thus a method of increasing a carrier air quantity of a coating device such that the powder coating material reliably reaches on the surface to be coated is employed in some cases. However, when increasing the carrier air quantity of the coating device, the powder particle is not stably attached on the surface to be coated, and therefore, the smoothness of the coating film is deteriorated and the uniformity of the thickness of the coating film is also deteriorated.

In consideration of the above described circumstance, the powder coating material in the exemplary embodiment forms a coating film which has excellent smoothness and high uniformity of a thickness thereof by setting the volume particle size distribution index GSDv to be less than 1.20, and setting the average circularity to be equal to or greater than 0.96 even when performing the electrostatic coating on a non-conductive member.

Since the volume particle size distribution index GSDv and the average circularity of the powder coating material is within the above-described range, particle size distribution of the powder particle forming the powder coating material is narrow, a coarse powder and a fine powder exist in small amount, and a shape of the powder particle is close to a sphere. Therefore, it is estimated that the powder coating material in the exemplary embodiment forms a coating film which has excellent smoothness and high uniformity of the thickness, by the following mechanism, even when performing the electrostatic coating on the non-conductive member.

First, it is estimated that the powder coating material in the exemplary embodiment improves the smoothness of the coating film and increases the uniformity of the thickness thereof when being discharged from the coating device, by the following mechanism.

The powder particle in the exemplary embodiment has the narrow particle size distribution and the shape which is close to the sphere, and thus the electrification (for example, triboelectrification) is stably performed. Therefore, there exists small variation in the amount of charge between the particles. In addition, since the fine powder exists in small amount in the powder particle and the shape of the powder particle is close to the sphere, it is less likely that the powder particles are aggregated to each other (blocking), and thus the powder particle is easily discharged from the coating device and is easily attached on the surface to be coated.

From the above description, the powder particle in the exemplary embodiment is attached on the surface to be coated with high uniformity, thereby forming the coating film which has excellent smoothness and high uniformity of the thickness.

In addition, in the powder particle in the exemplary embodiment, there exists small variation in the amount of charge between the particles as small, and it is less likely that the powder particles are aggregated to each other, and thus the powder particle is easily attached on the surface to be coated even when the electrification of the surface to be coated is relatively weak. Therefore, it is possible to employ a technique of imparting a charge through the corona discharge or the like as a method of electrifying the surface to be coated of the non-conductive member. Since it is not necessary to perform undercoating of the conductive primer on the surface to be coated or the steam treatment, and the carrier air quantity of the coating device is not necessarily increased when discharging the powder coating material, the smoothness of the coating film is not deteriorated by the aforementioned treatment.

In addition, it is estimated that the powder coating material in the exemplary embodiment improves the smoothness of the coating film and increases the uniformity of the thickness thereof, by the following mechanism in the surface to be coated.

Since the coarse powder exists in a small amount in the powder particle, unevenness caused by the coarse powder is less likely to occur on the surface of the coating film.

Since the fine powder exists in a small amount in the powder particle, the fluidity of the powder particle is satisfactory.

Since the shape of the powder particle is close to a sphere, the fluidity of the powder particle is satisfactory.

Since the shape of the powder particle is close to a sphere, it is less likely that a gap is formed between the powder particles, and unevenness occurs on the surface of the coating film.

With such a mechanism, it is estimated that the powder coating material in the exemplary embodiment forms a coating film which has excellent smoothness and high uniformity of the thickness even when performing the electrostatic coating on the non-conductive member.

The powder coating material in the exemplary embodiment may be used not only in the electrostatic coating method in which the non-conductive member is set to be the coated material, but also in electrostatic coating in which the conductive material is set to be the coated material, and may be applied to a known powder coating technique such as a fluidization dip.

The powder coating material in the exemplary embodiment includes the powder particle, and may include an external additive which is attached on the surface of the powder particle. It is desirable that the powder coating material in the exemplary embodiment includes the external additive which is attached on the surface of the powder particle so as to improve the fluidity.

Hereinafter, physical properties of the powder coating material in the exemplary embodiment will be specifically described.

Physical Properties of the Powder Coating Material

Volume average particle diameter D50v

In order to improve the uniformity of the thickness of the coating film, the volume average particle diameter D50v of the powder coating material is preferably 3 μm to 10 μm, is more preferably 4 μm to 10 μm, is further more preferably 4 μm to 8 μm, and is still more preferably 5 μm to 7 μm.

Volume Particle Size Distribution Index GSDv

In order to improve the smoothness of the coating film, the volume particle size distribution index GSDv of the powder particle is preferably less than 1.20, is more preferably equal to or less than 1.19, and is further more preferably equal to or less than 1.18.

Average Circularity

In order to improve the smoothness of the coating film, the average circularity the powder particle is preferably equal to or greater than 0.96, is more preferably equal to or greater than 0.97, and is further more preferably equal to or greater than 0.98.

Herein, the volume average particle diameter D50v and the volume particle size distribution index GSDv of the powder coating material are measured with a Coulter Multisizer II (manufactured by Beckman Coulter, Inc.) and ISOTON-II (manufactured by Beckman Coulter, Inc.) as an electrolyte.

In the measurement, from 0.5 mg to 50 mg of a measurement sample is added to 2 ml of a 5% aqueous solution of surfactant (preferably sodium alkyl benzene sulfonate) as a dispersing agent. The obtained material is added to 100 ml to 150 ml of the electrolyte.

The electrolyte in which the sample is suspended is subjected to a dispersion treatment using an ultrasonic disperser for 1 minute, and a particle size distribution of particles having a particle diameter of 2 μm to 60 μm is measured by a Coulter Multisizer II using an aperture having an aperture diameter of 100 μm. 50,000 particles are sampled.

Cumulative distributions by volume basis are drawn from the side of the smallest diameter with respect to particle size ranges (channels) separated based on the measured particle size distribution. The particle diameter when the cumulative percentage becomes 16% is defined as that corresponding to a volume average particle diameter D16v, while the particle diameter when the cumulative percentage becomes 50% is defined as that corresponding to a volume average particle diameter D50v. Furthermore, the particle diameter when the cumulative percentage becomes 84% is defined as that corresponding to a volume average particle diameter D84v.

A volume average particle size distribution index (GSDv) is calculated as $(D84v/D16v)^{1/2}$.

The average circularity of the powder particles is measured by using a flow type particle image analyzer "FPIA-3000 (manufactured by Sysmex Corporation)". Specifically, 0.1 ml to 0.5 ml of a surfactant (alkyl benzene sulfonate) as a dispersant is added into 100 ml to 150 ml of water obtained by removing impurities which are solid matter in advance, and 0.1 g to 0.5 g of a measurement sample is further added thereto. A suspension in which the measurement sample is dispersed is subjected to a dispersion process with an ultrasonic dispersion device for 1 minute to 3 minutes, and concentration of the dispersion is from 3,000 particles/μl to 10,000 particles/μl. Regarding this dispersion, the average circularity of the powder particles is measured by using the flow type particle image analyzer.

Herein, the average circularity of the powder particles is a value obtained by determining a circularity (Ci) of each of n particles having a particle diameter of 2 to 60 μm and then calculated by the following equation. However, in the following equation, Ci represents a circularity (=circumference length of a circle equivalent to a projected area of the particle/circumference length of a particle projection image), and fi represents frequency of the powder particles.

$$\text{Average circularity } (Ca) = \left(\sum_{i=1}^{n}(Ci \times fi)\right) \Big/ \sum_{i=1}^{n}(fi) \qquad \text{Expression 1}$$

Total Amount of Energy

In order to form a coating film which has excellent smoothness and high uniformity of the thickness, a total amount of energy of the powder coating material, which is measured by a powder rheometer, is preferably from 10 mJ to 80 mJ, is more preferably 15 mJ to 70 mJ, and is still more preferably 20 mJ to 60 mJ.

It is possible to control the total amount of energy of the powder coating material by a type and an amount of the external additive, and the volume particle size distribution index GSDv and the average circularity of the powder coating material. In order to control the total amount of energy of the powder coating material to be in the above-described range, the volume particle size distribution index GSDv of the powder coating material is preferably less than 1.20, and the average circularity of the powder coating material is preferably equal to or greater than 0.96.

Hereinafter, a method of measuring the total amount of energy of the powder coating material which is performed by using the powder rheometer will be described.

The powder rheometer is a fluidity measurement apparatus for measuring a rotational torque and a vertical load which are obtained by spirally rotating the filled particles with a rotor blade at the same time so as to directly calculate the fluidity. The fluidity affected by original properties of the powder and the external environment is detected by measuring both of the rotational torque and the vertical load. In addition, the measurement is performed after determining a range of a state of the filled particles in advance, and thereby it is possible to obtain data with satisfactory reproducibility.

The measurement is performed by using FT4 (manufactured by Freeman Technology) as the powder rheometer. In addition, in order to eliminate the influence of temperature and humidity before the measurement, the powder coating material which is kept for 8 hours or more under the environment of 25° C. of temperature and 25% RH of humidity is used.

First, a split container (the cylinder having the 22 mm of height is placed on a 25 mL container having the 61 mm of height, and the container is separated up and down) having an 25 mm of inner diameter is filled with the powder coating material having the amount over than the 61 mm of height of the container.

After the container is filled with the powder coating material, an operation for performing the homogenization of the sample by stirring the filled powder coating material sample is performed. Hereinafter, this operation is referred to as "conditioning".

In the conditioning, the filled powder coating materials are stirred by the rotor blade in a rotation direction which is not affected by the resistance from the powder coating material without giving a stress to the powder coating material, and the air and partial stress are removed, thereby setting the sample to be homogeneous. The stirring is performed under the specific conditioning conditions such that height is set to be 70 mm to 2 mm from the bottom surface in the container, an approach angle is set to be 40, and a tip speed of the rotor blade is set to be 40 mm/sec.

At this time, a propeller-type rotor blade is moved downward while being rotated and a tip end draws a spiral. An angle of a spiral path which is drawn by the tip end of propeller at this time is referred to as an approach angle.

After the conditioning operation is repeatedly performed four times, an upper end portion of the split container is moved, and the powder coating material with which the 25 mL of container is filled is obtained by using the powder coating materials in the vessel at a position of the 61 mm of height. The reason for the conditioning operation is that it is important to obtain the powder having a volume in a predetermined range so as to stably calculate a total amount of energy.

Further, after performing the conditioning operation once, the measurement of the rotational torque and the vertical load is performed when the rotor blade is rotated at the 100 mm/sec of tip end speed while being moved to the height within a range from 55 mm to 2 mm from the bottom surface in the container at the −4° of approach angle. The rotational direction of the propeller in this case is a direction reverse to the direction in which the conditioning is performed (clockwise when viewed from above).

Figure 1B:
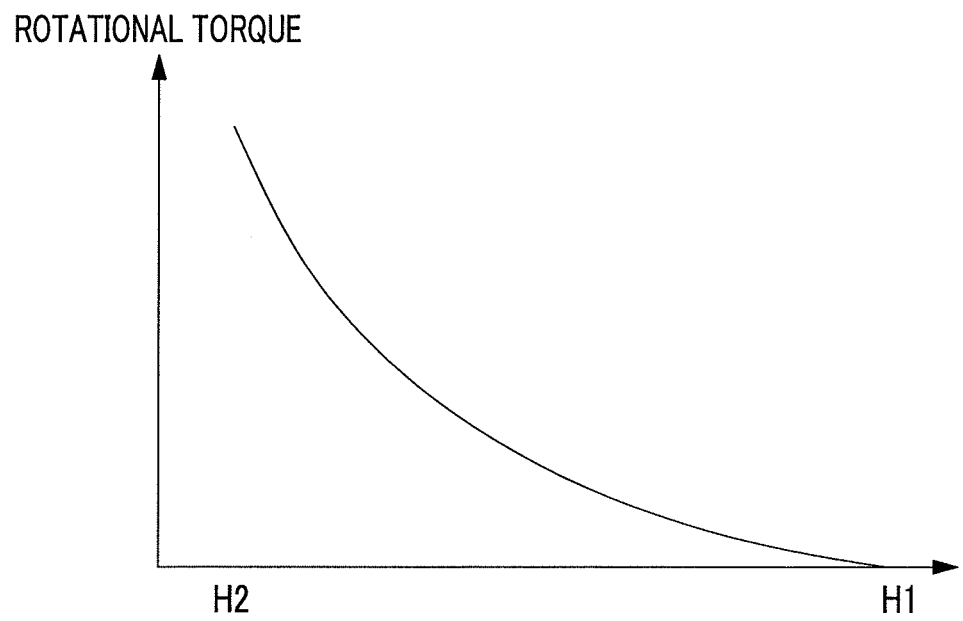

The relationship of the rotational torque or the vertical load with respect to the height H from the bottom surface is illustrated in FIG. 1A and FIG. 1B. From the rotational torque and the vertical load, the gradient of energy (mJ/mm) with respect to the height H is calculated and the result is illustrated in FIG. 2. An area obtained by integrating a gradient of energy in FIG. 2 (a portion indicated with hatched lines in FIG. 2) corresponds to a total amount of energy (mJ). The total amount of energy is calculated by integrating the section of the height within a range of from 2 mm to 55 mm from the bottom surface.

In addition, in order to reduce the influence of an error, an average value obtained by performing a cycle of the conditioning and the energy measuring operation five times is set to a total amount of energy (mJ).

Figure 3:
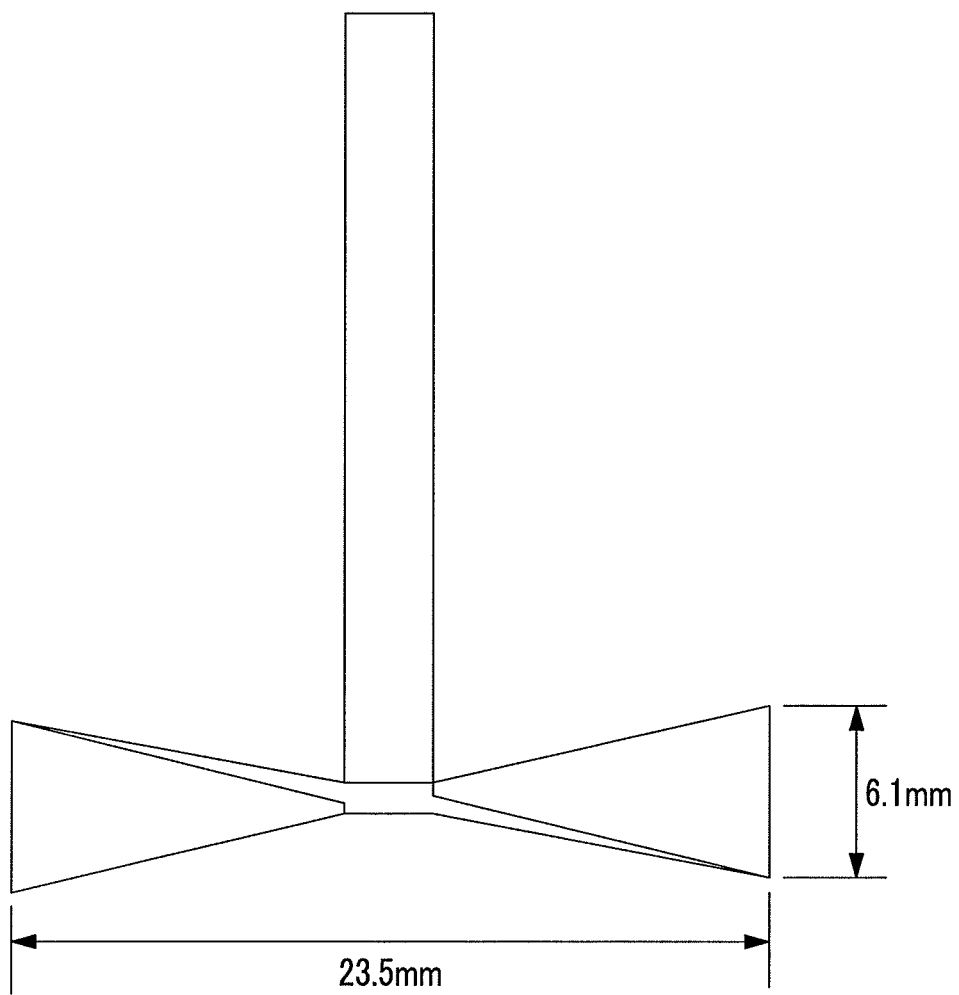
FIG. 3 is a schematic diagram illustrating a shape of a rotor blade used in the powder rheometer.

The rotor blade which is illustrated in FIG. 3 is a two-blade propeller type (manufactured by Freeman Technology) and a diameter thereof is 23.5 mm.

In addition, in the exemplary embodiment, when measuring the rotational torque and the vertical load of the rotor blade, a ventilation flow rate from the bottom of the container is set to be 0 ml/min. Meanwhile, an inflow state of ventilation flow rate is controlled in the FT4 (manufactured by Freeman Technology.).

Hereinafter, a configuration, a material, a composition, and the like of the powder coating material according to the exemplary embodiment will be described.

Powder Particle

The powder coating material in the exemplary embodiment includes a powder particle which contains a thermosetting resin and a thermosetting agent. The powder coating material in the exemplary embodiment may be any one of a transparent powder coating material (a clear coating material) in which the powder particle does not include a colorant and a colored powder coating material in which the powder particle includes a colorant.

In order to improve the uniformity of the thickness of the coating film, the volume average particle diameter D50v of the powder particle is preferably from 3 μm to 10 μm, is more preferably from 4 μm to 10 μm, is further more preferably from 4 μm to 8 μm, and is still more preferably from 5 μm to 7 μm.

In order to improve the smoothness of the coating film, the volume particle size distribution index GSDv of the powder particle is preferably less than 1.20, is more preferably equal to or less than 1.19, and is further more preferably equal to or less than 1.18.

In order to improve the smoothness of the coating film, the average circularity the powder particle is preferably equal to or greater than 0.96, is more preferably equal to or greater than 0.97, and is further more preferably equal to or greater than 0.98.

Meanwhile, the volume average particle diameter D50v of the powder particle, the volume particle size distribution index GSDv, and the average circularity are measured through the same method as the measuring method of the powder coating material.

The structure of the powder particle is not particularly limited. It is preferable that the powder particle has a structure including a core and a resin coating portion which covers a surface of the core. That is, the powder particle is preferably a particle having a core and shell structure.

Core

The powder particle contains the thermosetting resin and the thermosetting agent. In a case where the powder particle has a structure including the core and the resin coating portion, the core may contain the thermosetting resin and the thermosetting agent. The core may contain other additives such as a colorant.

Thermosetting Resin

The thermosetting resin is a resin including a thermosetting reaction group. In the related art, as the thermosetting resin, various types of resin used in the powder particles of the powder coating material are used.

The thermosetting resin may preferably be a water-insoluble (hydrophobic) resin. When the water-insoluble (hydrophobic) resin is used as the thermosetting resin, environmental dependence of a charging property of the powder coating material (powder particle) is decreased. When preparing the powder particle by an aggregation and coalescence method, the thermosetting resin is preferably a water-insoluble (hydrophobic) resin, in order to realize emulsification and dispersion in an aqueous medium. The water-insolubility (hydrophobicity) means a dissolved amount of a target material with respect to 100 parts by weight of water at 25° C. is less than 5 parts by weight.

Among the thermosetting resins, at least one type selected from the group consisting of a thermosetting (meth)acrylic resin and a thermosetting polyester resin is preferable.

Thermosetting (Meth)Acrylic Resin

The thermosetting (meth)acrylic resin is a (meth)acrylic resin including a thermosetting reaction group. For the introduction of the thermosetting reaction group to the thermosetting (meth)acrylic resin, a vinyl monomer including a thermosetting reaction group may preferably be used. The vinyl monomer including a thermosetting reaction group may be a (meth)acrylic monomer (monomer having a (meth)acryloyl group), or may be a vinyl monomer other than the (meth)acrylic monomer.

Examples of the thermosetting reaction group of the thermosetting (meth)acrylic resin include an epoxy group, a carboxylic group, a hydroxyl group, an amide group, an amino group, an acid anhydride group, a (block) isocyanate group, and the like. Among these, as the thermosetting reaction group of the (meth)acrylic resin, at least one type selected from the group consisting of an epoxy group, a carboxylic group, and a hydroxyl group is preferable, from the viewpoint of ease of preparation of the (meth)acrylic resin. Particularly, from the viewpoints of excellent storage stability of the powder coating material and coating film appearance, at least one type of the thermosetting reaction group is more preferably an epoxy group.

Examples of the vinyl monomer including an epoxy group as the thermosetting reaction group include various chain epoxy group-containing monomers (for example, glycidyl (meth)acrylate, β-methyl glycidyl (meth)acrylate, glycidyl vinyl ether, and allyl glycidyl ether), various (2-oxo-1,3-oxolane) group-containing vinyl monomers (for example, (2-oxo-1,3-oxolane) methyl (meth)acrylate), various alicyclic epoxy group-containing vinyl monomers (for example, 3,4-epoxy cyclohexyl (meth)acrylate, 3,4-epoxycyclohexylmethyl (meth)acrylate, and 3,4-epoxycyclohexylethyl (meth)acrylate), and the like.

Examples of the vinyl monomer including a carboxylic group as the thermosetting reaction group include various carboxylic group-containing monomers (for example, (meth)acrylic acid, crotonic acid, itaconic acid, maleic acid, and fumaric acid), various monoesters of α,β-unsaturated dicarboxylic acid and monohydric alcohol having 1 to 18 carbon atoms (for example, monomethyl fumarate, monoethyl fumarate, monobutyl fumarate, monoisobutyl fumarate, monotert-butyl fumarate, monohexyl fumarate, monooctyl fumarate, mono 2-ethylhexyl fumarate, monomethyl maleate, monoethyl maleate, monobutyl maleate, monoisobutyl maleate, monotert-butyl maleate, monohexyl maleate, monooctyl maleate, and mono 2-ethylhexyl maleate), monoalkyl ester itaconate (for example, monomethyl itaconate, monoethyl itaconate, monobutyl itaconate, monoisobutyl itaconate, monohexyl itaconate, monooctyl itaconate, and mono 2-ethylhexyl itaconate), and the like.

Examples of the vinyl monomer including a hydroxyl group as the thermosetting reaction group include various hydroxyl group-containing (meth)acrylates (for example, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and polypropylene glycol mono(meth)acrylate), an addition reaction product of the various hydroxyl group-containing (meth)acrylates and ε-caprolactone, various hydroxyl group-containing vinyl ethers (for example, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), an addition reaction product of the various hydroxyl group-containing vinyl ethers and ε-caprolactone, various hydroxyl group-containing allyl ethers (for example, 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether, and 6-hydroxyhexyl (meth)allyl ether), an addition reaction product of the various hydroxyl group-containing allyl ethers and ε-caprolactone, and the like.

Examples of the (meth)acrylic monomer not including a thermosetting reaction group which forms a constituent unit of the thermosetting (meth)acrylic resin include alkyl ester (meth)acrylate (for example, methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth) acrylate, dodecyl (meth)acrylate, isodecyl (meth)acrylate, lauryl (meth)acrylate, and stearyl (meth)acrylate), various aryl ester (meth)acrylates (for example, benzyl (meth)acrylate, phenyl (meth)acrylate, and phenoxyethyl (meth)acrylate), various alkyl carbitol (meth)acrylates (for example, ethyl carbitol (meth)acrylate), other various ester (meth) acrylates (for example, isobornyl (meth)acrylate, dicyclopentanyl (meth)acrylate, dicyclopentenyl (meth)acrylate, dicyclopentenyloxyethyl (meth)acrylate, and tetrahydrofurfuryl (meth)acrylate), various amino group-containing amide unsaturated monomers (for example, N-dimethylaminoethyl (meth)acrylamide, N-diethylaminoethyl (meth) acrylamide, N-dimethylaminopropyl (meth)acrylamide, and N-diethylamino propyl (meth)acrylamide), various dialkylaminoalkyl (meth)acrylates (for example, dimethylaminoethyl (meth)acrylate and diethylaminoethyl (meth)acrylate), various amino group-containing monomers (for example, tert-butylaminoethyl (meth)acrylate, tert-butylaminopropyl (meth)acrylate, aziridinylethyl (meth)acrylate, pyrrolidinylethyl (meth)acrylate, and piperidinylethyl (meth)acrylate), and the like.

In the thermosetting (meth)acrylic resin, the other vinyl monomer not including a thermosetting reaction group may be copolymerized, in addition to the (meth)acrylic monomer.

Examples of the other vinyl monomer include various α-olefins (for example, ethylene, propylene, and butene-1), various halogenated olefins except fluoroolefin (for example, vinyl chloride and vinylidene chloride), various aromatic vinyl monomers (for example, styrene, α-methyl styrene, and vinyl toluene), various diesters of unsaturated dicarboxylic acid and monohydric alcohol having 1 to 18 carbon atoms (for example, dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate), various acid anhydride group-containing monomers (for example, maleic anhydride, itaconic anhydride, citraconic anhydride, (meth)acrylic anhydride, and tetrahydrophthalic anhydride), various phosphoric acid ester group-containing monomers (for example, diethyl-2-(meth) acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate), various hydrolyzable silyl group-containing monomers (for example, γ-(meth)acryloyloxypropyl trimethoxysilane, γ-(meth)acryloyloxypropyl triethoxysilane, and γ-(meth) acryloyloxypropyl methyldimethoxysilane), various vinyl aliphatic carboxylate (for example, vinyl acetate, vinyl propionate, vinyl butyrate, vinyl isobutyrate, vinyl caproate, vinyl caprylate, vinyl caprate, vinyl laurate, branched vinyl aliphatic carboxylate having 9 to 11 carbon atoms, and vinyl stearate), various vinyl ester of carboxylic acid having a cyclic structure (for example, cyclohexane carboxylic acid vinyl, methylcyclohexane carboxylic acid vinyl, vinyl benzoate, and p-tert-butyl vinyl benzoate), and the like.

The thermosetting (meth)acrylic resin is preferably an acrylic resin having a number average molecular weight of from 1,000 to 20,000 (more preferably from 1,500 to 15,000) from the viewpoint of providing excellent smoothness of the coating film.

The weight average molecular weight and the number average molecular weight of the thermosetting (meth)acrylic resin are measured by gel permeation chromatography (GPC). The molecular weight measurement by GPC is performed with a THF solvent using HLC-8120 GPC, which is GPC manufactured by Tosoh Corporation as a measurement device and TSKgel Super HM-M (15 cm), which is a column manufactured by Tosoh Corporation. The weight average molecular weight and the number average molecular weight are calculated using a calibration curve of molecular weight created with a monodisperse polystyrene standard sample from results of this measurement.

Thermosetting Polyester Resin

The thermosetting polyester resin is, for example, a polycondensate obtained by polycondensing at least polybasic acid and polyol. The introduction of the thermosetting reaction group to the thermosetting polyester resin is performed by adjusting an amount of polybasic acid and polyol used. With this adjustment, a thermosetting polyester resin including at least one of a carboxylic group and a hydroxyl group as a thermosetting reaction group is obtained.

Examples of polybasic acid include terephthalic acid, isophthalic acid, phthalic acid, methylterephthalic acid, trimellitic acid, pyromellitic acid, or anhydrides thereof; succinic acid, adipic acid, azelaic acid, sebacic acid, or anhydrides thereof; maleic acid, itaconic acid, or anhydrides thereof; fumaric acid, tetrahydrophthalic acid, methyltetrahydrophthalic acid hexahydrophthalic acid, methylhexahydrophthalic acid, or anhydrides thereof; cyclohexane dicarboxylic acid, 2,6-naphthalene dicarboxylic acid, and the like.

Examples of polyol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-hydroxyethyl terephthalate, cyclohexanedimethanol, octanediol, diethylpropane diol, butylethylpropane diol, 2-methyl-1,3-propane diol, 2,2,4-trimethylpentane diol, hydrogenated bisphenol A, an ethylene oxide adduct of hydrogenated bisphenol A, a propylene oxide adduct of hydrogenated bisphenol A, trimethylolethane, trimethylolpropane, glycerin, pentaerythritol, tris-hydroxyethyl isocyanurate, hydroxy pivalyl hydroxy pivalate, and the like.

The thermosetting polyester resin may be obtained by polycondensing other monomer in addition to polybasic acid and polyol.

Examples of the other monomer include a compound including both a carboxylic group and a hydroxyl group in one molecule (for example, dimethanol propionic acid and hydroxy pivalate), a monoepoxy compound (for example, glycidyl ester of branched aliphatic carboxylic acid such as "Cardura E10 (manufactured by Shell)"), various monohydric alcohols (for example, methanol, propanol, butanol, and benzyl alcohol), various monobasic acids (for example, benzoic acid and p-tert-butyl benzoate), various fatty acids (for example, castor oil fatty acid, coconut oil fatty acid, and soybean oil fatty acid), and the like.

The structure of the thermosetting polyester resin may be a branched structure or a linear structure.

From a view point that the thermosetting polyester resin is excellent in the smoothness of the coating film, the polyester resin, of which a total value of an acid value and a hydroxyl value is from 10 mgKOH/g to 250 mgKOH/g, and the number average molecular weight is from 1,000 to 100,000, is preferable.

The measurement of the acid value and the hydroxyl value of the thermosetting polyester resin is performed based on JIS K0070-1992. The measurement of the weight average molecular weight and the number average molecular weight of thermosetting polyester resin is performed in the same way as that of the thermosetting (meth)acrylic resin.

The glass transition temperature (Tg) of the thermosetting resin which is included in the core is preferably equal to or lower than 60° C., and more preferably equal to or lower than 55° C. from the viewpoint of the excellent smoothness of the coating film even in case of being baked at a low temperature.

The glass transition temperature (Tg) of the thermosetting resin is calculated by a DSC curve obtained by a differential scanning calorimetry (DSC). Specifically, the glass transition temperature of the thermosetting resin is obtained based on "extrapolated starting temperature of glass transition" which is described in a section of a method for obtaining a glass transition temperature of "a measuring method for a transition temperature of plastics" (JIS K7121-1987).

The thermosetting resin may be used alone or in combination of two or more types thereof.

The content of the thermosetting resin of the core is preferably from 20% by weight to 99% by weight, and is more from 30% by weight to 95% by weight.

Other Resins

The core may include a non-curable resin. However, in order to improve curing density (crosslinking density) of the coating film, in the core the ratio of the non-curable resin with respect to the entire resin is preferably equal to or less than 5% by weight, is more preferably equal to or less than 1% by weight, and is preferably not to be substantially included. That is, it is preferable that the thermosetting resin is the only resin included in the core.

In a case where the core includes the non-curable resin, as the non-curable resin, at least one type selected from a group consisting of the (meth)acrylic resin and the polyester resin is preferable.

Thermosetting Agent

The thermosetting agent is selected in response to the thermosetting reaction group of the thermosetting resin.

Specifically, in a case where the thermosetting reaction group of the thermosetting resin is an epoxy group, examples of the thermosetting agent include acids such as succinic acid, glutaric acid, adipic acid, pimelic acid, suberic acid, azelaic acid, sebacic acid, dodecanedioic acid, eicosanedioic acid, maleic acid, citraconic acid, itaconic acid, glutaconic acid, phthalic acid, trimellitic acid, pyromellitic acid, tetrahydrophthalic acid, hexahydrophthalic acid, and cyclohexene-1,2-dicarboxylic acid; anhydrides thereof; and urethane-modified products thereof. Among these, as the thermosetting agent, aliphatic dibasic acid is preferable from the viewpoints of a physical property of the coating film and storage stability, and dodecanedioic acid is particularly preferable from the viewpoint of the physical property of the coating film.

When the thermosetting reactive group of the thermosetting resin is a carboxyl group, specific examples of the thermosetting agent include various epoxy resins (for example, polyglycidylether of bisphenol A), an epoxy group-containing acrylic resin (for example, glycidyl group-containing acrylic resin), various polyglycidylethers of polyol (for example, 1,6-hexanediol, trimethylol propane, and trimethylol ethane), various polyglycidylesters of polycarboxylic acid (for example, phthalic acid, terephthalic acid, isophthalic acid, hexahydrophthalic acid, methyl hexahydrophthalic acid, trimellitic acid, and pyromellitic acid), various alicyclic epoxy group-containing compounds (for example, bis(3,4-epoxy cyclohexyl) methyl adipate), hydroxy amide (for example, triglycidylisocyanurate and β-hydroxyalkyl amide), and the like.

When the thermosetting reactive group of the thermosetting resin is a hydroxyl group, examples of the thermosetting agent include blocked polyisocyanate, aminoplast, and the like. Examples of the isocyanate compound forming blocked polyisocyanate include organic diisocyanate, a polymer of the organic diisocyanate (an isocyanurate-type polyisocyanate compound), a polyol adduct of the organic diisocyanate, a low-molecular weight polyester resin (for example, polyester polyol) adduct of the organic diisocyanate, and a water adduct of the organic diisocyanate. Here, Examples of the organic diisocyanate include various aliphatic diisocyanates (for example, hexamethylene diisocyanate and trimethyl hexamethylene diisocyanate), various alicyclic diisocyanates (for example, xylylene diisocyanate and isophorone diisocyanate), and various aromatic diisocyanates (for example, tolylene diisocyanate and 4,4'-diphenylmethane diisocyanate). Examples of a blocking agent of the isocyanate group include an oxime compound such as formaldoxime, acetaldoxime, acetone oxime, methyl ethyl ketoxime, methyl isobutyl ketoxime, and cyclohexanone oxime, and the like.

The thermosetting agent may be used alone or in combination of two or more types thereof.

The content of the thermosetting agent is preferably from 1% by weight to 30% by weight, and is more preferably from 3% by weight to 20% by weight with respect to the thermosetting resin of the core.

Colorant

As a colorant, a pigment is used, for example. As the colorant, a pigment and a dye may be used in combination.

Examples of a pigment include an inorganic pigment such as iron oxide (for example, colcothar), titanium oxide, titanium yellow, zinc white, white lead, zinc sulfide, lithopone, antimony oxide, cobalt blue, and carbon black; an organic pigment such as quinacridone red, phthalocyanine blue, phthalocyanine green, permanent red, Hansa yellow, indanthrene Blue, Brilliant Fast Scarlet, and benzimidazolone yellow; and the like.

In addition, as the pigment, a brilliant pigment is also used. Examples of the brilliant pigment include metal powder such as a pearl pigment, aluminum powder, stainless steel powder; metallic flakes; glass beads; glass flakes; mica; and flaky iron oxide (MIO).

The colorant may be used alone or in combination of two or more types thereof.

The content of the colorant is determined depending on types of the pigment, and the hue, brightness, and the depth required for the coating film. The content of the colorant is, for example, preferably from 1% by weight to 70% by weight and more preferably from 2% by weight to 60% by weight, with respect to the entire resin in the core and the resin coating portion.

Other Additive

As the other additive, various additives used in the powder coating material are used. Specific examples of the other additive include a surface adjusting agent (silicone oil or acrylic oligomer), a foam inhibitor (for example, benzoin or benzoin derivatives), a hardening accelerator (an amine compound, an imidazole compound, or a cationic polymerization catalyst), a plasticizer, a charge-controlling agent, an antioxidant, a pigment dispersant, a flame retardant, a fluidity-imparting agent, and the like.

Resin Coating Portion

The resin coating portion includes a resin. The resin coating portion may be configured only of a resin, or may include other additives (the thermosetting agent described regarding the core, or other additives). However, the resin coating portion is preferably configured only of a resin, in order to further reduce the bleeding on the surface of the powder particles. Even when the resin coating portion includes the other additives, the content of the resin is preferably equal to or greater than 90% by weight (more preferably equal to or greater than 95% by weight) with respect to the entire resin coating portion.

The resin of the resin coating portion may be a non-curable resin, or may be a thermosetting resin. However, the resin of the resin coating portion may be a thermosetting resin, in order to improve curing density (crosslinking density) of the coating film. When the thermosetting resin is used as the resin of the resin coating portion, the thermosetting resin is preferably at least one type selected from a group consisting of a thermosetting (meth)acrylic resin and a thermosetting polyester resin. The thermosetting resin of the resin coating portion may be the same type of the resin as the thermosetting resin of the core or may be different resin therefrom. When the non-curable resin is used as the resin of the resin coating portion, the non-curable resin is preferably at least one type selected from a group consisting of an (meth)acrylic resin and a polyester resin.

A coverage of the resin coating portion with respect to the surface of the powder particle is preferably from 30% to 100% and more preferably from 50% to 100%, in order to prevent bleeding on the surface of the powder particle.

The coverage of the resin coating portion with respect to the surface of the powder particle is a value determined by X-ray photoelectron spectroscopy (XPS) measurement. Specifically, in the XPS measurement, JPS-9000MX manufactured by JEOL Ltd. is used as a measurement device, and the measurement is performed using a MgK$\alpha$ ray as the X-ray source and setting an accelerating voltage to 10 kV and an emission current to 30 mA.

The coverage of the resin coating portion with respect to the surface of the powder particles is quantized by peak separation of a component derived from the material of the core and a component derived from a material of the resin coating portion on the surface of the powder particles, from the spectrum obtained under the conditions described above. In the peak separation, the measured spectrum is separated into each component using curve fitted by the least square method.

As the component spectrum to be a base for a peak separation, usable are spectrums obtained by measuring a resin used for the core, a thermosetting agent, a pigment, an additive, or a resin used for a resin coating portion, singly, which is used in preparation of the powder particle. In addition, the coverage is determined from a ratio of a spectral intensity derived from the coating resin with respect to the total of entire spectral intensity.

A thickness of the resin coating portion is preferably from 0.2 µm to 4 µm and more preferably from 0.3 µm to 3 µm, in order to prevent bleeding on the surface of the powder particle.

The thickness of the resin coating portion is a value measured by the following method. The powder particle is embedded in the epoxy resin or the like, and a sliced piece is prepared by performing cutting with a diamond knife or the like. This sliced piece is observed using a transmission electron microscope (TEM) or the like and plural images of the cross section of the powder particles are imaged. The thicknesses of 20 portions of the resin coating portion are measured from the images of the cross section of the powder particle, and an average value thereof is used. When it is difficult to distinguish between the resin coating portion and the core in the image of the cross section due to a clear powder coating material, it is possible to easily perform the measurement by performing dyeing before observing.

The content of the entire thermosetting resin of the powder particles is preferably from 20% by weight to 99% by weight, and more preferably from 30% by weight to 95% by weight, with respect to the entirety of the powder particles.

The content of the entire thermosetting agent of the powder particles is preferably from 1% by weight to 30% by weight, and more preferably from 3% by weight to 20% by weight with respect to the entire thermosetting resin of the entire powder particle.

Di- or Higher-Valent Metal Ions

The powder particle preferably includes di- or higher-valent metal ions (hereinafter, simply referred to as "metal ion"). That is, the powder particle preferably includes a metal which is capable of being a di- or higher-valent ion. The metal ion may include any one of the core and the resin coating portion in a case where the powder particle has a structure including the core and the resin coating portion. A carboxyl group or a hydroxyl group which is included in the resin included in the powder particle interacts with di- or higher-valent metal ions and ion crosslinking is formed. With this ion crosslinking, the bleeding on the surface of the powder particle is prevented, and the storage property of the powder particle is easily improved. In addition, the bond of the ion crosslinking is broken due to heating at the time of thermal curing, and accordingly, there is no concern in that the melt viscosity of the powder particle is increased even when the di- or higher-valent metal ion is included and the smoothness of the coating film is deteriorated.

Examples of the di- or higher-valent metal ions include divalent to tetravalent metal ions. Specifically, at least one type of metal ion selected from a group consisting of aluminum ions, magnesium ions, iron ions, zinc ions, and calcium ions is used.

As a supply source of the metal ion (compound added to the powder particle as an additive), metal salt, an inorganic metal salt polymer, a metal complex, and the like are used, for example. For example, when preparing the powder particle by an aggregation and coalescence method, the metal salt, the inorganic metal salt polymer, and the inorganic metal salt polymer are added to the powder particle as an aggregating agent. In addition, for example, the metal salt, the inorganic metal salt polymer, and the inorganic metal salt polymer are added to the powder particle as a catalyst which promotes the thermosetting reaction, without particularly limiting the use.

Examples of the metal salt include aluminum sulfate, aluminum chloride, magnesium chloride, magnesium sulfate, iron (II) chloride, zinc chloride, calcium chloride, calcium sulfate, and the like.

Examples of the inorganic metal salt polymer include polyaluminum chloride, polyaluminum hydroxide, iron (II) polysulfate, calcium polysulfide, and the like.

Examples of the metal complex include metal salt of an aminocarboxylic acid and the like. Specific examples of the metal complex include metal salt (for example, calcium salt, magnesium salt, iron salt, and aluminum salt) using a well known chelate as a base such as ethylenediamine tetraacetic acid, propanediamine tetraacetic acid, nitrilotriacetic acid, triethylenetetramine hexaacetic acid, diethylenetriamine pentacetic acid, and the like.

As the valence of the metal ions is high, mesh ion crosslinking is easily formed, and it is preferable from the viewpoints of further improving smoothness of the coating film and the storage properties of the powder coating material. Accordingly, the metal ions are preferably Al ions. That is, the supply source of the metal ions is preferably aluminum salt (for example, aluminum sulfate or aluminum chloride), or an aluminum salt polymer (for example, polyaluminum chloride or polyaluminum hydroxide). Among the supply sources of the metal ions, the inorganic metal salt polymer is preferable, compared to the metal salt, even though the valences of the metal ions thereof are the same as each other, from the viewpoints of smoothness of the coating film and the storage properties of the powder coating material. Accordingly, the supply source of the metal ions is particularly preferably an aluminum salt polymer (for example, polyaluminum chloride or polyaluminum hydroxide).

The content of the metal ions is preferably from 0.002% by weight to 0.2% by weight and more preferably from 0.005% by weight to 0.15% by weight, with respect to the entire powder particle, from the viewpoints of further improving the storage properties of the powder coating material and smoothness of the coating film.

When the content of the metal ions is equal to or greater than 0.002% by weight, suitable ion crosslinking is formed by the metal ions, bleeding on the surface of the powder particle is prevented, and the storage properties of the powder coating material are improved. Meanwhile, when the content of the metal ions is equal to or smaller than 0.2% by weight, the formation of excessive ion crosslinking by the metal ions is prevented, and the smoothness of the coating film is improved.

Herein, when preparing the powder particles by an aggregation and coalescence method, the supply source of the metal ions added as an aggregating agent (for example, the metal salt, the inorganic metal salt polymer or the metal complex) contributes to controlling the particle diameter distribution and shapes of the powder particles.

Specifically, high valence of the metal ions is preferable, in order to obtain a narrow particle size distribution. In addition, in order to obtain a narrow particle size distribution, the inorganic metal salt polymer is preferable, compared to the metal salt, even though the valences of the metal ions thereof are the same as each other. Accordingly, from the viewpoints described above, the supply source of the metal ions is preferably aluminum salt (for example, aluminum sulfate or aluminum chloride) and an aluminum salt polymer (for example, polyaluminum chloride or polyaluminum hydroxide), and particularly preferably an aluminum salt polymer (for example, polyaluminum chloride or polyaluminum hydroxide).

When the aggregating agent is added so that the content of the metal ions is equal to or greater than 0.002% by weight, aggregation of the resin particles in the aqueous medium proceeds, and this contributes to realization of the narrow particle size distribution. The aggregation of the resin particles to be the resin coating portion proceeds with respect to the aggregated particles to be the core, and this contributes to realization of the formation of the resin coating portion with respect to the entire surface of the core. Meanwhile, when the aggregating agent is added so that the content of the metal ions is equal to or smaller than 0.2% by weight, excessive ion crosslinking in the aggregated particles is prevented, and the shape of the powder particles formed when performing coalescence is easily set to be close to a sphere. Accordingly, from the viewpoints described above, the content of the metal ions is preferably from 0.002% by weight to 0.2% by weight and more preferably from 0.005% by weight to 0.15% by weight.

The content of the metal ions in the powder particles is measured by an X-ray fluorescence analysis (XRF). Specifically, for example, first, a resin and a supply source of metal ions are mixed with each other to prepare a resin mixture having a predetermined concentration of the metal ions. A pellet sample is obtained with 200 mg of the resin mixture by using a tableting tool having a diameter of 13 mm. This pellet sample is precisely weighed, and the fluorescent X-ray intensity of the pellet sample is measured, to obtain peak intensity. In the same manner as described above, the measurement is performed for the pellet sample obtained by changing the added amount of the supply source of the metal ions, and a calibration curve is created with the results. The quantitative analysis of the content of the metal ions in the powder particle to be a measurement target is performed by using this calibration curve.

Examples of an adjusting method of the content of the metal ions include 1) a method of adjusting the added amount of the supply source of the metal ions, 2) a method of adjusting the content of the metal ions including, in a case of preparing the powder particles by an aggregation and coalescence method, adding the aggregating agent (for example, metal salt or the inorganic metal salt polymer) as the supply source of the metal ions in an aggregation step, adding a chelating agent (for example, ethylenediamine tetraacetic acid (EDTA), diethylenetriamine pentacetic acid (DTPA), or nitrilotriacetic acid (NTA)) at a last stage of the aggregation step, forming the metal ions and a complex by the chelating agent, and removing the formed complex salt in a washing step.

External Additive

Since an external additive prevents occurrence of aggregation between the powder particles, it is possible to form a coating film having high smoothness with a small amount thereof. Specific examples of the external additive include inorganic particles. Examples of the inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

Surfaces of the inorganic particles as an external additive are preferably subjected to a hydrophobizing treatment. The hydrophobizing treatment is performed by, for example, dipping the inorganic particles in a hydrophobizing agent. The hydrophobizing agent is not particularly limited and examples thereof include a silane coupling agent, silane, silicone oil, a titanate coupling agent, and an aluminum coupling agent. These may be used alone or in combination of two or more types thereof.

Generally, the amount of the hydrophobizing agent is, for example, from 1 part by weight to 10 parts by weight with respect to 100 parts by weight of the inorganic particles.

The volume average particle diameter of the external additive is preferably from 5 nm to 40 nm, and more preferably from 8 nm to 30 nm. With the external additive having the volume average particle diameter of from 5 nm to 40 nm, when coating a material with the powder coating material by using a spray gun, the powder particles are dispersed by the airflow and are likely to be scattered as a primary particle, and thereby the powder particle may be attached to the coated material as being the primary particle.

The amount of the external additive externally added is, for example, preferably from 0.01% by weight to 5% by weight and more preferably from 0.01% by weight to 2.0% by weight, with respect to the powder particles.

Preparing Method of Powder Coating Material

Next, a preparing method of the powder coating material according to the exemplary embodiment will be described.

After preparing the powder particles, the powder coating material according to the exemplary embodiment is obtained by externally adding the external additives to the powder particles, if necessary, or by classifying the powder particles, if necessary.

The powder particles may be prepared using any of a dry preparing method (e.g., kneading and pulverizing method) and a wet preparing method (e.g., aggregation and coalescence method, suspension and polymerization method, and dissolution and suspension method). The powder particle preparing method is not particularly limited to these preparing methods, and a known preparing method is employed. Among these, the powder particles are may be obtained by an aggregation and coalescence method, in terms of that it is possible to easily control the volume average particle diameter distribution index GSDv and the average circularity to be in the preferable range described above.

Specifically, the powder particles are preferably prepared by performing: a step of forming first aggregated particles by aggregating first resin particles and a thermosetting agent in a dispersion in which the first resin particles containing a thermosetting resin, and the thermosetting agent are dispersed, or by aggregating composite particles in a dispersion in which composite particles containing a thermosetting resin and a thermosetting agent are dispersed; a step of forming second aggregated particles by mixing a first aggregated particle dispersion in which the first aggregated particles are dispersed and a second resin particle dispersion in which second resin particles containing the resin are dispersed, with each other, aggregating the second resin particles on the surface of the first aggregated particles, and forming second aggregated particles in which the second resin particles are attached to the surface of the first aggregated particles; and a step of heating a second aggregated particle dispersion in which the second aggregated particles are dispersed to coalesce the second aggregated particles.

In the powder particle prepared by this aggregation and coalescence method, a portion where the first aggregated particles are coalesced is the core, and portion where the second resin particles attached to the surface of the first aggregated particles are coalesced is the resin coating portion.

Hereinafter, the respective steps will be described in detail. In the following description, a preparing method of powder particles containing a colorant will be described, but the colorant is only used if necessary.

Dispersion Preparation Step

First, each dispersion used in the aggregation and coalescence method is prepared. Specifically, a first resin particle dispersion in which first resin particles containing the thermosetting resin of the core are dispersed, a thermosetting agent dispersion in which the thermosetting agent is dispersed, a colorant dispersion in which the colorant is dispersed, and a second resin particle dispersion in which second resin particles containing the resin of the resin coating portion are dispersed, are prepared.

In addition, a composite particle dispersion in which the composite particles containing the thermosetting resin and the thermosetting agent of the core are dispersed is prepared, instead of the first resin particle dispersion and the thermosetting agent dispersion in which the thermosetting agent is dispersed.

In the dispersion preparation step, the first resin particles, the second resin particles, and the composite particles are collectively described as the "resin particles".

Herein, a resin particle dispersion is, for example, prepared by dispersing the resin particles in a dispersion medium with a surfactant.

An aqueous medium is used, for example, as the dispersion medium used in the resin particle dispersion.

Examples of the aqueous medium include water such as distilled water, ion exchange water, or the like, alcohols, and the like. The medium may be used alone or in combination of two or more types thereof.

Examples of the surfactant include anionic surfactants such as sulfuric ester salt, sulfonate, phosphate ester, and soap anionic surfactants; cationic surfactants such as amine salt and quaternary ammonium salt cationic surfactants; and nonionic surfactants such as polyethylene glycol, alkyl phenol ethylene oxide adduct, and polyol nonionic surfactants. Among these, anionic surfactants and cationic surfactants are particularly used. Nonionic surfactants may be used in combination with anionic surfactants or cationic surfactants.

The surfactants may be used alone or in combination of two or more types thereof.

Regarding the resin particle dispersion, as a method of dispersing the resin particles in the dispersion medium, a common dispersing method using, for example, a rotary shearing-type homogenizer, or a ball mill, a sand mill, or a Dyno mill having media is exemplified. Depending on the type of the resin particles, the resin particles may be dispersed in the resin particle dispersion using, for example, a phase inversion emulsification method.

The phase inversion emulsification method includes: dissolving a resin to be dispersed in a hydrophobic organic solvent in which the resin is soluble; conducting neutralization by adding a base to an organic continuous phase (O phase); and converting the resin (so-called phase inversion) from W/O to O/W by adding an aqueous medium (W phase) to form a discontinuous phase, thereby dispersing the resin as particles in the aqueous medium.

Specifically, in the case where the resin particle dispersion is a (meth)acrylic resin particle dispersion, a monomer forming the (meth)acrylic resin is emulsified in an aqueous medium, a water-soluble initiator and a chain transfer agent are added thereto and heated to perform emulsification and polymerization, and accordingly, the resin particle dispersion in which (meth)acrylic resin particles are dispersed is obtained.

In the case where the resin particle dispersion is a polyester resin particle dispersion, after performing heating, melting, and polycondensing under reduced pressure with respect to a monomer forming the polyester resin, a solvent (for example, ethyl acetate) is added to and dissolved in the obtained polycondensation product, and the obtained solution is stirred while adding a weak alkaline aqueous solution thereto, and subjected to phase inversion emulsification, and accordingly, the resin particle dispersion in which polyester resin particles are dispersed is obtained.

Meanwhile, when the resin particle dispersion is the composite particle dispersion, the resin and the thermosetting agent are mixed with each other, and are dispersed (for example, subjected to emulsification such as phase inversion emulsification) in a dispersion medium, and accordingly the composite particle dispersion is obtained.

The volume average particle diameter of the resin particles dispersed in the resin particle dispersion is, for example, preferably equal to or smaller than 1 μm, more preferably from 0.01 μm to 1 μm, even more preferably from 0.08 μm to 0.8 μm, and still more preferably from 0.1 μm to 0.6 μm.

Regarding the volume average particle diameter of the resin particles, a cumulative distribution by volume is drawn from the side of the smallest diameter with respect to particle size ranges (channels) separated using the particle size distribution obtained by the measurement with a laser diffraction-type particle size distribution measuring device (for example, LA-700 manufactured by Horiba, Ltd.), and a particle diameter when the cumulative percentage becomes 50% with respect to the entire particles is measured as a volume average particle diameter D50v. The volume average particle diameter of the particles in other dispersions is also measured in the same manner.

The content of the resin particles contained in the resin particle dispersion is, for example, preferably from 5% by weight to 50% by weight, and more preferably from 10% by weight to 40% by weight.

For example, the thermosetting agent dispersion and the colorant dispersion are also prepared in the same manner as in the preparation of the resin particle dispersion. That is, the dispersion medium, the surfactant, the dispersing method, and the volume average particle diameter and the content of the particles with respect to the colorant dispersion and the thermosetting agent dispersion are the same as those with respect to the resin particle dispersion.

First Aggregated Particle Forming Step

Next, the first resin particle dispersion, the thermosetting agent dispersion, and the colorant dispersion are mixed with each other.

The first resin particles, the thermosetting agent, and the colorant are heterogeneously aggregated in the mixed dispersion, thereby forming first aggregated particles having a diameter near a target powder particle diameter and including the first resin particles, the thermosetting agent, and the colorant.

Specifically, for example, an aggregating agent is added to the mixed dispersion and a pH of the mixed dispersion is adjusted to be acidic (for example, the pH is from 2 to 5). If necessary, a dispersion stabilizer is added. Then, the mixed dispersion is heated at a temperature near to the glass transition temperature of the first resin particles (specifically, for example, from a temperature 30° C. lower than the glass transition temperature of the first resin particles to a temperature 10° C. lower than the glass transition temperature thereof) to aggregate the particles dispersed in the mixed dispersion, thereby forming the first aggregated particles.

In the first aggregated particle forming step, the first aggregated particles may be formed by mixing the composite particle dispersion including the thermosetting resin and the thermosetting agent, and the colorant dispersion with each other and heterogeneously aggregating the composite particles and the colorant in the mixed dispersion.

In the first aggregated particle forming step, for example, the aggregating agent may be added at room temperature (for example, 25° C.) while stirring of the mixed dispersion using a rotary shearing-type homogenizer, the pH of the mixed dispersion may be adjusted to be acidic (for example, the pH is from 2 to 5), a dispersion stabilizer may be added if necessary, and the heating may then be performed.

Examples of the aggregating agent include a surfactant having an opposite polarity to the polarity of the surfactant being contained in the mixed dispersion as the dispersing agent, metal salt, a inorganic metal salt polymer, and a metal complex. When a metal complex is used as the aggregating agent, the amount of the surfactant used is reduced and charging characteristics are improved.

After completing the aggregation, an additive for forming a complex or a similar bond with metal ions of the aggregating agent may be used, if necessary. A chelating agent is suitably used as this additive. With the addition of this chelating agent, the content of the metal ions of the powder particles may be adjusted, when the aggregating agent is excessively added.

Herein, the metal salt, the inorganic metal salt polymer, or the metal complex as the aggregating agent is used as a supply source of the metal ions. These examples are as described above.

A water-soluble chelating agent is used as the chelating agent. Specific examples of the chelating agent include oxycarboxylic acids such as tartaric acid, citric acid, and gluconic acid, and aminocarboxylic acids such as iminodiacetic acid (IDA), nitrilotriacetic acid (NTA), and ethylenediaminetetraacetic acid (EDTA).

The amount of the chelating agent added is, for example, preferably from 0.01 parts by weight to 5.0 parts by weight, and more preferably from 0.1 parts by weight to less than 3.0 parts by weight with respect to 100 parts by weight of the resin particles.

Second Aggregated Particle Forming Step

Next, the obtained first aggregated particle dispersion in which the first aggregated particles are dispersed is mixed together with the second resin particle dispersion.

The second resin particles may be the same type as the first resin particles or may be an irregular type therefrom.

Aggregation is performed such that the second resin particles are attached to the surface of the first aggregated particles in the mixed dispersion in which the first aggregated particles and the second resin particles are dispersed, thereby forming second aggregated particles in which the second resin particles are attached to the surface of the first aggregated particles.

Specifically, in the first aggregated particle forming step, for example, when the particle diameter of the first aggregated particles reaches a target particle diameter, the second resin particle dispersion is mixed with the first aggregated particle dispersion, and the mixed dispersion is heated at a temperature equal to or lower than the glass transition temperature of the second resin particles. By setting pH of the mixed dispersion to be in a range of 6.5 to 8.5, for example, the progress of the aggregation is stopped. Accordingly, the second aggregated particles aggregated in such a way that the second resin particles are attached to the surface of the first aggregated particles are obtained.

Coalescence Step

Next, the second aggregated particle dispersion in which the second aggregated particles are dispersed is heated at, for example, a temperature that is equal to or higher than the glass transition temperature of the first and second resin particles (for example, a temperature that is higher than the glass transition temperature of the first and second resin particles by 10° C. to 30° C.) to coalesce the second aggregated particles and form the powder particles.

The powder particles are obtained through the foregoing steps.

Herein, after the coalescence step ends, the powder particles formed in the dispersion are subjected to a washing step, a solid-liquid separation step, and a drying step, that are well known, and thus dry powder particles are obtained. In the washing step, preferably displacement washing using ion exchange water is sufficiently performed from the viewpoint of charging properties. In addition, the solid-liquid separation step is not particularly limited, but suction filtration, pressure filtration, or the like is preferably performed from the viewpoint of productivity. The method for the drying step is also not particularly limited, but freeze drying, airflow drying, fluidized drying, vibration-type fluidized drying, or the like is preferably performed from the viewpoint of productivity.

The powder coating material according to the exemplary embodiment is prepared by adding and mixing, for example, an external additive to the obtained dry powder particles, if necessary. The mixing is preferably performed with, for example, a V-blender, a Henschel mixer, a Lodige mixer, or the like. Furthermore, if necessary, coarse particles of the powder coating material may be removed using a vibration sieving machine and a wind classifier, or the particle size distribution may be narrowed.

The coated material of the powder coating material of the exemplary embodiment is not particularly limited, and not only the non-conductive member may be set as the coated material but also the conductive member may be set as the coated material. Examples of the coated material include various resin components, wood components, glass components, ceramic components, and metal components. These coated materials may be uncompleted products which are not yet molded to the products such as a plate-shaped product or a linear product, and may be molded products which are molded to be used in a road vehicle, an interior and exterior material of a building, an electronic component, and the like. In addition, these coated materials may be a product including a surface to be coated which is subjected to a surface treatment such as a primer treatment, a plating treatment, or an electrodeposition coating, in advance.

Coating Method

An exemplary embodiment of the coating method using the powder coating material according to the exemplary embodiment will be described below.

The coating method according to the exemplary embodiment is a coating method of coating the powder coating material on the non-conductive member, and includes a charge imparting step of imparting a negative or positive charge onto the surface to be coated of the non-conductive member, an electrostatic coating step of electrifying the powder coating material having an opposite polarity to the polarity of the charge, which is imparted to the non-conductive member, and then performing the electrostatic coating on the non-conductive member, and a baking step of baking the electrostatically coated powder coating material on the non-conductive member.

The coating method according to the exemplary embodiment is performed by using the powder coating material in the exemplary embodiment, and thus the coating film which has excellent smoothness and high uniformity of the thickness is formed.

Charge Imparting Step

The charge imparting step is a step of imparting a positive or negative charge on the surface to be coated of the non-conductive member. Examples of a method of imparting the charge with respect to the surface to be coated of the non-conductive member specifically includes a corona discharge and a contact discharge which is performed by coming in contact with a metallic material, and the corona discharge is preferable.

Electrostatic Coating Step

The electrostatic coating step is a step of electrifying the powder coating material having an opposite polarity to the polarity of the charge, which is imparted to the non-conductive member, and then performing the electrostatic coating on the non-conductive member. A method of electrifying the powder coating material may be any one of a triboelectrification method and a corona electrification method, and the triboelectrification method is preferably used in order to form a coating film which is excellent in the smoothness.

The powder coating material in the exemplary embodiment is easily discharged even with a relatively small quantity of a carrier air of the coating device. The carrier air quantity when the powder coating material is discharged from the coating device is, for example, from 0.5 L/min to 100 L/min, and is preferably from 1 L/min to 20 L/min.

Baking Step

The baking step is a step of baking the electrostatically coated powder coating material on the non-conductive member. In this step, a coating film is formed by heating the coated surface which is coated with the powder coating material to thereby cure the powder coating material. The electrostatic coating step and the baking step may be performed at the same time.

A heating temperature (baking temperature) in the baking step is preferably from 90° C. to 250° C., is more preferably from 100° C. to 220° C., and is further more preferably from 120° C. to 200° C.

A heating time (baking time) in the baking step is adjusted in response to the heating temperature (the baking temperature). The heating time (the baking time) is, for example, within a range from 20 minutes to 60 minutes.

The thickness of the coating film is preferably, for example, from 10 μm to 100 μm, and is more preferably from 20 μm to 70 μm.

Examples of the non-conductive member include a member of which a material is formed of a resin, glass, wood, paper, concrete, and rubber.

The powder coating material in the exemplary embodiment may use an electrostatic coating method in which a conductive material is set as the coated material, or a known powder coating technique such as a fluidization dip, other than the above-described coating method.

EXAMPLES

Hereinafter, the exemplary embodiment will be described in detail using examples, but is not limited to these examples. In the following description, unless specifically noted, "parts" are based on the weight.

Preparation of Colorant Dispersion C1

| | |
|---|---|
| Cyan pigment (C.I. Pigment Blue 15:3, (copper phthalocyanine) manufactured by Dainichiseika Color & Chemicals Mfg. Co., Ltd.): | 100 parts by weight |
| Anionic surfactant (NEOGEN RK manufactured by Daiichi Kogyo Seiyaku Co., Ltd.): | 15 parts by weight |
| Ion exchange water: | 285 parts by weight |

The above described materials are mixed, and dispersed for 1 hour by using a high pressure impact-type disperser Ultimaizer (HJP 30006, manufactured by Sugino Machine Ltd.) so as prepare a colorant dispersion C1 having a solid content of 25% by weight. The colorant dispersion C1 has a cyan pigment of which the volume average particle diameter is 0.13 μm.

Preparation of Colorant Dispersion M1

The colorant dispersion M1 having a solid content of 25% by weight is prepared in the same manner as in the case of the preparation of the colorant dispersion C1 except that the cyan pigment is changed to a magenta pigment (quinacridone pigment, CHROMOFINE MAGENTA 6887, manufactured by Dainichiseika Color & Chemicals Mfg. Co., Ltd). The colorant dispersion M1 has the magenta pigment of which the volume average particle diameter is 0.14 μm.

Preparation of Colorant Dispersion Y1

The colorant dispersion Y1 having a solid content of 25% by weight is prepared in the same manner as in the case of the preparation of the colorant dispersion C1 except that the cyan pigment is changed to a yellow pigment (Paliotol Yellow D1155, manufactured by BASF Coatings Japan Ltd.). The colorant dispersion Y1 has the yellow pigment of which the volume average particle diameter is 0.13 μm.

Preparation of Colorant Dispersion K1

The colorant dispersion K1 having a solid content of 25% by weight is prepared in the same manner as in the case of the preparation of the colorant dispersion C1 except that the cyan pigment is changed to black pigment (Regal 330, manufactured by Cabot Corporation). The colorant dispersion K1 has the black pigment of which the volume average particle diameter is 0.11 μm.

Preparation of Colorant Dispersion W1

| | |
|---|---|
| Titanium oxide (A-220, manufactured by ISHIHARA SANGYO KAISHA, LTD.): | 100 parts |
| Anionic surfactant (NEOGEN RK, manufactured by Daiichi Kogyo Seiyaku Co., Ltd.): | 15 parts by weight |
| Ion exchange water: | 285 parts |

The above described materials are mixed, and dispersed for 3 hours by using a high pressure impact-type disperser Ultimaizer (HJP 30006, manufactured by Sugino Machine Ltd.) so as to prepare a colorant dispersion W1 having a solid content of 25% by weight. The colorant dispersion W1 has the titanium oxide of which the volume average particle diameter is 0.25 μm.

Preparation of Polyester Resin PE1

| | |
|---|---|
| Terephthalic acid: | 742 parts (100 mol %) |
| Neopentyl glycol: | 312 parts (62 mol %) |
| Ethylene glycol: | 59.4 parts (20 mol %) |
| Glycerin: | 90 parts (18 mol %) |
| Dibutyl tin oxide: | 0.5 parts |

The above described materials are charged into a reaction container which is provided with a stirrer, a thermometer, a nitrogen gas injection port, and a rectifying tower, and a temperature of the reaction container is increased up to 240° C. while the materials are stirred in a nitrogen atmosphere so as to perform a polycondensation reaction.

The obtained polyester resin PE1 has a configuration such that a glass transition temperature is 55° C., an acid value is 8 mgKOH/g, a hydroxyl value is 70 mgKOH/g, a weight average molecular weight is 26,000, and a number average molecular weight is 8,000.

Preparing Composite Particle Dispersion 1

While maintaining a jacketed 3-liter reaction vessel (manufactured by Tokyo Rikakikai Co, Ltd.: BJ-30N) which is equipped with a capacitor, the thermometer, a water dripping device, and an anchor blade at 40° C. in a thermostat circulating water bath, a mixed solvent obtained by mixing 180 parts of ethyl acetate and 80 parts of isopropyl alcohol is added into the reaction vessel, and then the following compositions are added thereinto.

| | |
|---|---|
| Polyester resin (PE1): | 240 parts |
| Thermosetting (VESTAGON B1530 manufactured by Evonik Industries): | 60 parts |
| Benzoin: | 3 parts |
| Acrylic oligomer (Acronal 4F manufactured by BASF Japan Ltd.): | 3 parts |

The above components are charged and the resultant is stirred at 150 rpm by using a three-one motor to dissolve the stirred mixture, thereby obtaining a oil phase. A mixed liquid of 1 part of 10% by weight of aqueous ammonia solution and 47 parts of 5% by weight of aqueous sodium hydroxide is added dropwise to the oil phase being stirred over 5 minutes, the resultant is mixed for 10 minutes, and then 900 parts of the ion exchange water is added dropwise to the mixture a rate of 5 parts for every minute so as to perform phase inversion, thereby obtaining an emulsion.

Subsequently, 800 parts of the obtained emulsion and 700 parts of the ion exchange water are added into a 2-liter round-bottom flask, and the mixture is set in an evaporator (manufactured by Tokyo Rikakikai Co, Ltd.) which is provided with a vacuum control unit via a trap. The round-bottom flask is heated in a hot tub at 60° C. while the flask is rotated, and a solvent is removed by reducing the pressure to 7 kPa with attention to bumping up the hot tub. At the time when a collected amount of solvents reaches 1100 parts, the pressure is returned to a normal pressure and the round-bottom flask is cooled with water to thereby obtain the dispersion of a composite particle including a thermosetting polyester resin and a thermosetting agent. The obtained dispersion has no smell of solvent.

Thereafter, 2% by weight of an anionic surfactant (manufactured by Dow Chemical Company, Dowfax2A1, an amount of active ingredient: 45% by weight) is added to the amount of the resin in the dispersion as an active component and mixed, and then the ion exchange water is added thereto, thereby adjusting the solid content concentration to be 20% by weight. The resultant is set to be a composite particle dispersion 1. The volume average particle diameter of the composite particles in the composite particle dispersion 1 is 150 nm.

Preparation of Polyester Resin Particle Dispersion 1

The polyester resin particle dispersion 1 is obtained under the same conditions as those for preparing the composite particle dispersion 1 except that the polyester resin PE1 is set to be 300 parts, and the thermosetting agent, benzoin, and an acrylic oligomer are not added.

Example C1

Preparation of Colored Powder Coating Material C1

Aggregation Step

| | |
|---|---|
| composite particle dispersion 1: | 325 parts (solid content: 65 parts) |
| colorant dispersion C1: | 3 parts (solid content: 0.75 parts) |
| colorant dispersion W1: | 150 parts (solid content: 37.5 parts) |

The above described materials are mixed and dispersed in a round-bottom stainless steel flask by using a homogenizer (ULTRA-TURRAX T50 manufactured by IKA Ltd.). Subsequently, pH is adjusted to 2.5 by using a 1.0% by weight of aqueous solution of nitric acid. A 0.50 parts of 10% by weight of polyaluminum chloride aqueous solution is added to the resultant, and then the dispersing operation is continuously performed by the homogenizer.

A stirrer and a mantle heater are installed in the round-bottom stainless steel flask, and a temperature in the flask is increased up to 50° C. while the rotation rate of the stirring device is properly adjusted so that slurries are sufficiently stirred. After leaving the resultant for 15 minutes at 50° C., and when the volume average particle diameter becomes 5.5 µm, the 100 parts (solid content 20 parts) of polyester resin particle dispersion 1 is slowly charged into the flask. Thereafter, 40 parts of 10% by weight of nitrilotriacetic acid metal salt solution (trade name: CHELEST 70, manufactured by Chelest Corporation) are added, and then, the pH of the liquid is adjusted to 6.0 by using a 5% by weight of sodium hydroxide aqueous solution.

Coalescence Step

After adjusting the pH, the resultant is kept for 30 minutes, and then, is kept for 1.5 hours at the temperature in the flask which is increased up to 85° C. A shape of the particle in the dispersion is confirmed to be substantially spherical by using an optical microscope.

Filtering Step, Washing Step, and Drying Step

After completing the coalescence step, the solution in the flask is cooled, and filtered so as to obtain the solid content. Next, the solid content is washed with sufficient ion exchange water, and then a solid-liquid separation is performed by Nutsche-type suction filtration so as to obtain the solid content again. Subsequently, the solid content is washed by being dispersed again into the 3-liter ion exchange water at 40° C., and stirred at 300 rpm for 15 minutes. The washing operation is repeated five times, and the solid-liquid separation is performed through the Nutsche-type suction filtration to obtain a solid content, and the solid content is subjected to vacuum-drying for 12 hours. The resultant is set to be a colored powder particle C1.

External Addition of External Additive

As a positive electrification external additive, a 0.6% by weight of hydrophobic silica particle TG820F (manufactured by Cabot Corporation, a primary particle size of 8 nm) is mixed with the colored powder particle C1, and the powder particles are subjected to classifying repeatedly until the volume particle size distribution index GSDv becomes less than 1.20. Thus, the colored powder coating material C1 is obtained.

Regarding the colored powder coating material C1, the properties thereof are measured through the above-described measuring method.

Example C2

Preparation of Colored Powder Coating Material C2

The colored powder particle C2 and the colored powder coating material C2 are prepared in the same manner as in the case of Example C1 except that a 10% by weight of nitrilotriacetic acid metal salt solution is not used, and the amount of the 10% by weight of polyaluminum chloride aqueous solution is changed to be 1.8 parts in the aggregation step.

Example C3

Preparation of Colored Powder Coating Material C3

The colored powder particle C3 and the colored powder coating material C3 are prepared in the same manner as in the case of Example C1 except that the resultant is kept for 1.2 hours at the temperature in the flask which is increased up to 85° C. in the coalescence step.

Example C4

Preparation of Colored Powder Coating Material C4

The colored powder particle C4 and the colored powder coating material C4 are prepared in the same manner as in the case of Example C1 except that the 10% by weight of nitrilotriacetic acid metal salt solution is not used, the amount of the 10% by weight of polyaluminum chloride aqueous solution is changed to be 2.2 parts in the aggregation step, and the resultant is kept for 15 minutes at the temperature in the flask which is increased up to 50° C., and thereafter, the resultant is kept for 15 minutes at the temperature in the flask which is decreased up to 32° C. in the coalescence step.

Example C5

Preparation of Colored Powder Coating Material C5

The colored powder particle C5 and the colored powder coating material C5 are prepared in the same manner as in the case of Example C1 except that the resultant is kept for 15 minutes at the temperature in the flask which is increased up to 50° C., and thereafter the resultant is kept for 25 minutes at the temperature in the flask which is increased up to 60° C. in the coalescence step.

Comparative Example C1

Preparation of Colored Powder Coating Material XC1

The colored powder particle XC1 is prepared in the same manner as in the case of Example C1 except that the 10% by weight of nitrilotriacetic acid metal salt solution is not used, and the amount of the 10% by weight of polyaluminum chloride aqueous solution is changed to be 2.2 parts in the aggregation step, and the colored powder coating material XC1 is prepared without performing the classification after externally adding the external additive.

Comparative Example C2

Preparation of Colored Powder Coating Material XC2

The colored powder particle XC2 and colored powder coating material XC2 are prepared in the same manner as in the case of Example C1 except that the resultant is kept for 40 minutes at the temperature in the flask which is increased up to 85° C. in the coalescence step.

Example M1

Preparation of Colored Powder Coating Material M1

The colored powder particle M1 and the colored powder coating material M1 are prepared in the same manner as in the case of Example C1 except that the colorant dispersion C1 is changed to the colorant dispersion M1.

Example Y1

Preparation of Colored Powder Coating Material Y1

The colored powder particle Y1 and the colored powder coating material Y1 are prepared in the same manner as in the case of Example C1 except that colorant dispersion C1 is changed to the 5 parts of colorant dispersion Y1.

Example K1

Preparation of Colored Powder Coating Material K1

The colored powder particle K1 and the colored powder coating material K1 are prepared in the same manner as in the case of Example C1 except that the colorant dispersion C1 is changed to the colorant dispersion K1.

Example W1

Preparation of Colored Powder Coating Material W1

The colored powder particle W1 and colored powder coating material W1 are prepared in the same manner as in the case of Example C1 except that the colorant dispersion C1 is not added.

Evaluation

Preparation of Coating Sample

As a material to be coated, a glass plate, a wood plate, and a sheet, which are subjected to the heat treatment for 24 hours at 80° C., are prepared. A negative charge is imparted to the material through the corona discharge, and then the powder coating material is electrostatically coated by being subjected to the positive electrification by using a tribo gun, and is baked (at a heating temperature of 180° C. and a heating time of 30 minutes), thereby obtaining the coating sample. A coated amount of the powder coating material is set to the amount corresponding to the coating film having a thickness of 30 μm.

Uniformity of Film Thickness

The thickness of each of five coating films is measured by using a dual-type film thickness meter (LZ-990, manufactured by Kett Electric Laboratory), and an average value d1 and a difference d2 between a maximum value and a minimum value are obtained so as to calculate (d2/d1×100) (%). The result thereof is classified as follows:

G1: equal to or less than 15%
G2: greater than 15% and equal to or less than 20%
NG: greater than 20%

Smoothness of the Coating Film

A filtered-wave center line waviness Wca (unit: μm) of a surface of the coating sample is measured by using a surface roughness measuring instrument (SURFCOM 1400A, manufactured by Tokyo Seimitsu, Inc., Japan), and the result is classified as follows:

Glass plate (using a glass plate having the filtered-wave center line waviness Wca of equal to or less than 0.01 μm)

G1: equal to or less than 0.06 μm
G2: greater than 0.06 μm and equal to or less than 0.1 μm
NG: greater than 0.1 μm Wood plate (using a wood plate having the filtered-wave center line waviness Wca of equal to or less than 0.6 μm)

G1: equal to or less than 0.3 μm
G2: greater than 0.3 μm and equal to or less than 0.4 μm
NG: greater than 0.4 μm Sheet (using a sheet having the filtered-wave center line waviness Wca of equal to or less than 2.5 μm)

G1: equal to or less than 1.5 μm
G2: greater than 1.5 μm and equal to or less than 2.0 μm
NG: greater than 2.0 μm The properties and evaluation result of the respective examples are shown in Table 1.

TABLE 1

| | | Comparative Example C1 | Comparative Example C2 | Example C1 | Example C2 | Example C3 | Example C4 |
|---|---|---|---|---|---|---|---|
| Physical properties of powder coating material | Volume average particle diameter D50v [μm] | 5.7 | 5.6 | 5.6 | 5.6 | 5.7 | 3.2 |
| | Volume particle size distribution index GSDv | 1.32 | 1.19 | 1.19 | 1.18 | 1.18 | 1.19 |
| | Average circularity | 0.96 | 0.92 | 0.97 | 0.97 | 0.96 | 0.97 |
| | Total amount of energy [mJ] | 90 | 98 | 38 | 28 | 29 | 35 |
| Evaluation of coating film | Uniformity of film thickness — Glass plate | NG | NG | G1 | G1 | G1 | G1 |
| | Wood plate | NG | NG | G1 | G1 | G1 | G1 |
| | Sheet | NG | NG | G1 | G1 | G1 | G1 |
| | Smoothness — Glass plate | NG | G2 | G1 | G1 | G1 | G1 |
| | Wood plate | G2 | NG | G1 | G1 | G1 | G1 |
| | Sheet | NG | NG | G1 | G1 | G1 | G1 |

| | | Example C5 | Example M1 | Example Y1 | Example K1 | Example W1 |
|---|---|---|---|---|---|---|
| Physical properties of powder coating material | Volume average particle diameter D50v [μm] | 9.8 | 5.6 | 5.6 | 5.6 | 5.7 |
| | Volume particle size distribution index GSDv | 1.18 | 1.19 | 1.18 | 1.18 | 1.19 |

TABLE 1-continued

|  |  |  | | | | | |
|---|---|---|---|---|---|---|---|
| | Average circularity | | 0.97 | 0.97 | 0.97 | 0.97 | 0.97 |
| | Total amount of energy [mJ] | | 28 | 36 | 35 | 29 | 30 |
| Evaluation of coating film | Uniformity of film thickness | Glass plate | G1 | G1 | G1 | G1 | G1 |
| | | Wood plate | G1 | G1 | G1 | G1 | G1 |
| | | Sheet | G1 | G1 | G1 | G1 | G1 |
| | Smoothness | Glass plate | G1 | G1 | G1 | G1 | G1 |
| | | Wood plate | G1 | G1 | G1 | G1 | G1 |
| | | Sheet | G1 | G1 | G1 | G1 | G1 |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A thermosetting powder coating material, comprising a powder particle containing a thermosetting resin and a thermosetting agent,
   wherein the powder particle has a volume particle size distribution index GSDv of from 1.18 to 1.20 and an average circularity of not less than 0.96, and
   wherein the thermosetting resin is a thermosetting polyester comprised of a polycondensate of a polyol and at least one polybasic acid selected from the group consisting of terephthalic acid, isophthalic acid, phthalic acid, methylterephthalic acid, trimellitic acid, pyromellitic acid, succinic acid, adipic acid, azelaic acid, sebacic acid, maleic acid, itaconic acid, fumaric acid, tetrahydrophthalic acid, methyltetrahydrophthalic acid, hexahydrophthalic acid, methylhexahydrophthalic acid, cyclohexane dicarboxylic acid, 2,6-naphthalene dicarboxylic acid, or anhydrides thereof.

2. The thermosetting powder coating material according to claim 1,
   which has a volume average particle diameter of from 3 μm to 10 μm.

3. The thermosetting powder coating material according to claim 1,
   wherein the powder particle includes a core and a resin coating portion which covers a surface of the core.

4. The thermosetting powder coating material according to claim 1,
   wherein a total value of an acid value and a hydroxyl value of the thermosetting polyester resin is from 10 mgKOH/g to 250 mgKOH/g.

5. The thermosetting powder coating material according to claim 1,
   wherein a number average molecular weight of the thermosetting polyester resin is from 1,000 to 100,000.

6. The thermosetting powder coating material according to claim 3,
   wherein the core of the powder particle includes a thermosetting resin having a glass transition temperature (Tg) of 60° C. or less.

7. The thermosetting powder coating material according to claim 1,
   wherein a total amount of energy of the powder coating material, which is measured by a powder rheometer, is from 10 mJ to 80 mJ.

8. The thermosetting powder coating material according to claim 3,
   wherein a content of the thermosetting agent is from 1% by weight to 30% by weight with respect to the thermosetting resin of the core.

9. The thermosetting powder coating material according to claim 3,
   wherein a coverage of the resin coating portion on a surface of the powder particle is from 30% to 100%.

10. The thermosetting powder coating material according to claim 1,
    wherein the powder particle includes a metal which is capable of being a di- or higher-valent ion.

11. The thermosetting powder coating material according to claim 10,
    wherein a content of the metal is from 0.002% by weight to 0.2% by weight with respect to the powder particle.

12. The thermosetting powder coating material according to claim 10,
    wherein the metal is aluminum.

13. The thermosetting powder coating material according to claim 1, further comprising an external additive.

14. The thermosetting powder coating material according to claim 13,
    wherein a volume average particle diameter of the external additive is from 5 nm to 40 nm.

15. The thermosetting powder coating material according to claim 13,
    wherein an added amount of the external additive is from 0.01% by weight to 5% by weight with respect to the powder particle.

16. A coating method comprising:
    imparting a positive or negative charge to a surface to be coated of a non-conductive member;
    electrifying the thermosetting powder coating material according to claim 1 to have an opposite polarity to the polarity of the charge which is imparted to the non-conductive member to thereby perform electrostatic coating on the non-conductive member; and
    baking the electrostatically coated thermosetting powder coating material on the non-conductive member.

17. The coating method according to claim 16,
    wherein in the imparting, a positive or negative charge is imparted through corona discharge.

18. The coating method according to claim 16,
    wherein in the electrifying, the thermosetting powder coating material is triboelectrified.

* * * * *